US010080172B2

(12) United States Patent
Rost

(10) Patent No.: US 10,080,172 B2
(45) Date of Patent: Sep. 18, 2018

(54) METHOD FOR OPERATING A CENTRALIZED RADIO ACCESS NETWORK

(71) Applicant: NEC Europe Ltd., Heidelberg (DE)

(72) Inventor: Peter Rost, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/536,669

(22) PCT Filed: Dec. 19, 2014

(86) PCT No.: PCT/EP2014/078674
§ 371 (c)(1),
(2) Date: Jun. 16, 2017

(87) PCT Pub. No.: WO2016/096033
PCT Pub. Date: Jun. 23, 2016

(65) Prior Publication Data
US 2017/0353903 A1 Dec. 7, 2017

(51) Int. Cl.
H04W 36/22 (2009.01)
H04W 36/24 (2009.01)
(Continued)

(52) U.S. Cl.
CPC ........... *H04W 36/24* (2013.01); *G06F 9/455* (2013.01); *H04W 36/22* (2013.01); *H04W 88/04* (2013.01)

(58) Field of Classification Search
None
See application file for complete search history.

(56) References Cited

U.S. PATENT DOCUMENTS

| 2012/0099562 A1* | 4/2012 | Smadi | H04W 36/08 370/332 |
| 2015/0049623 A1* | 2/2015 | Yuk | H04W 36/30 370/252 |
| 2015/0131565 A1* | 5/2015 | Nakashima | H04L 1/0026 370/329 |

FOREIGN PATENT DOCUMENTS

WO WO 2013125918 A1 8/2013

OTHER PUBLICATIONS

Boccardi F et al: "User-centric architectures: Enabling CoMP via hardware virtualization", 2012 IEEE 23$^{rd}$ International Symposium on Personal, Indoor and Mobile Radio Communications (PIMRC 2012): Sydney, Australia, Sep. 9-12, 2012, IEEE, Piscataway, NJ, Sep. 9, 2012 (Sep. 9, 2012), pp. 191-196, XP032272859.

(Continued)

*Primary Examiner* — David Bilodeau
(74) *Attorney, Agent, or Firm* — Leydig, Voit & Mayer, Ltd.

(57) ABSTRACT

A method for operating a centralized radio access network (C-RAN) having a plurality of base stations, wherein at least a portion of base station processing is performed at a centralized processing entity, and wherein a virtualized environment is provided by the centralized processing entity such that the plurality of base stations run in virtual machines, includes relocating base station processing from a first virtual machine that performs base station processing for a first base station that serves an initial cell to a second virtual machine by: introducing a target cell for which the second virtual machine performs base station processing, simultaneously transmitting, via at least a portion of antennas of the first base station, signals for both the initial cell and the target cell, and handing over user terminals that are assigned to the initial cell to the target cell.

20 Claims, 3 Drawing Sheets

(51) Int. Cl.
   *H04W 88/04*      (2009.01)
   *G06F 9/455*      (2018.01)

(56) References Cited

OTHER PUBLICATIONS

Bernd Haberland et al: "Radio Base Stations in the Cloud", Bell Labs Technical Journal, vol. 18, No. 1, Jun. 30, 2013 (Jun. 30, 2013), pp. 129-152, XP055098994.
Zhenbo Zhu et al: "Virtual base station pool: towards a wireless network cloud for radio access networks", Computing Frontiers, ACM, 2 Penn Plaza, Suite 701 New York NY 10121-0701 USA, May 3, 2011 (May 3, 2011), pp. 1-10, XP058006421.
3GPP TS 36.331 V9.18.0 (Jun. 2014), $3^{rd}$ Generation Partnership Project; Technical Specification Group Radio Access Network; Evolved Universal Terrestrial Radio Access (E-UTRA); Radio Resource Control (RRC); Protocol specification (Release 9), Jun. 2014.

\* cited by examiner

METHOD FOR OPERATING A CENTRALIZED RADIO ACCESS NETWORK

CROSS REFERENCE TO RELATED APPLICATIONS

This application is a U.S. National Stage application under 35 U.S.C. § 371 of International Application No. PCT/EP2014/078674 filed on Dec. 19, 2014. The International Application was published in English on Jun. 23, 2016 as WO 2016/096033 A1 under PCT Article 21(2).

STATEMENT REGARDING FUNDING

The work leading to this invention has received funding from the European Union's Seventh Framework Programme (FP7) under grant agreement no 317941.

FIELD

The present invention relates to a method for operating a centralized radio access network, C-RAN, wherein said network comprises a number of base stations, wherein at least a part of the base station processing is performed at a centralized processing entity, and wherein a virtualized environment is provided at said centralized processing entity such that said base stations run in virtual machines.

Furthermore, the present invention relates to a centralized radio access network, C-RAN, comprising a number of base stations, and a centralized processing entity configured to perform at least a part of the base station processing, wherein a virtualized environment is provided at said centralized processing entity such that said base stations run in virtual machines.

Still further, the present invention relates to a base station for deployment in a centralized radio access network, C-RAN, comprising a radio unit including a number of antennas, and communication means for enabling communication between said radio unit and a virtual machine established at a centralized processing entity where at least a part of the base station processing is performed.

BACKGROUND

An overview of Centralized Radio Access Network (C-RAN) architectures—also known as Cloud Radio Access Network or distributed base station architectures—as addressed by the present invention is given in "C-RAN—The Road Towards Green RAN", China Mobile Research Institute, White Paper, Version 2.5, October 2011. Possible C-RAN architecture options currently being considered are as shown in FIG. 1, where the C-RAN is generally referred to by reference numeral 1. Basically, in C-RAN architecture, a functional split of the base station functionality is realized between distributed access points and a centralized access controller. More specifically, the access points, according to conventional prior art terminology also denoted as radio function units or remote radio heads (RRH) 2, are separated from the base station's access controller 3, also referred to as digital function unit or baseband unit (BBU), with a backhaul link 4 between RRHs 2 and access controller 3. The advent of centralized-RAN technology enables the potential to have centralized processing of data.

In the centralized radio access network (C-RAN) of FIG. 1, base station processing is centralized at a data center 5. This (centralized) data center 5 performs part or all of the processing which is traditionally performed at the (remote) base stations, i.e. analog-to-digital conversion (in the case of "Radio over Fiber") and digital base band processing ("Remote Radio Head"), see for reference C. Chen and J. Huang, "Suggestions on potential solutions to C-RAN by NGMN alliance," NGMN Alliance, Tech. Rep., January 2013.

CRAN systems may either run on dedicated hardware (so called baseband pools) which deploys the same processing architecture as base stations, or they run on commodity hardware where standardized IT hardware is deployed. In both cases, but particularly in the latter case, a virtualized environment can be provided such that base stations run in virtual machines where each virtual machine receives access to part of the data center resources. The actual amount of resources which is provided may not be revealed to the virtual machine, but only a virtualized representation. The major advantage of deploying virtual machines lies in the fact that load fluctuations (in terms of processing load) can be balanced across multiple base stations and across time.

SUMMARY

In an embodiment, the present invention provides a method for operating a centralized radio access network (C-RAN) including a plurality of base stations, wherein at least a portion of base station processing is performed at a centralized processing entity, and wherein a virtualized environment is provided by the centralized processing entity such that the plurality of base stations run in virtual machines. The method includes relocating base station processing from a first virtual machine that performs base station processing for a first base station that serves an initial cell to a second virtual machine by: introducing a target cell for which the second virtual machine performs base station processing; simultaneously transmitting, via at least a portion of antennas of the first base station, signals for both the initial cell and the target cell; and handing over user terminals that are assigned to the initial cell to the target cell.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
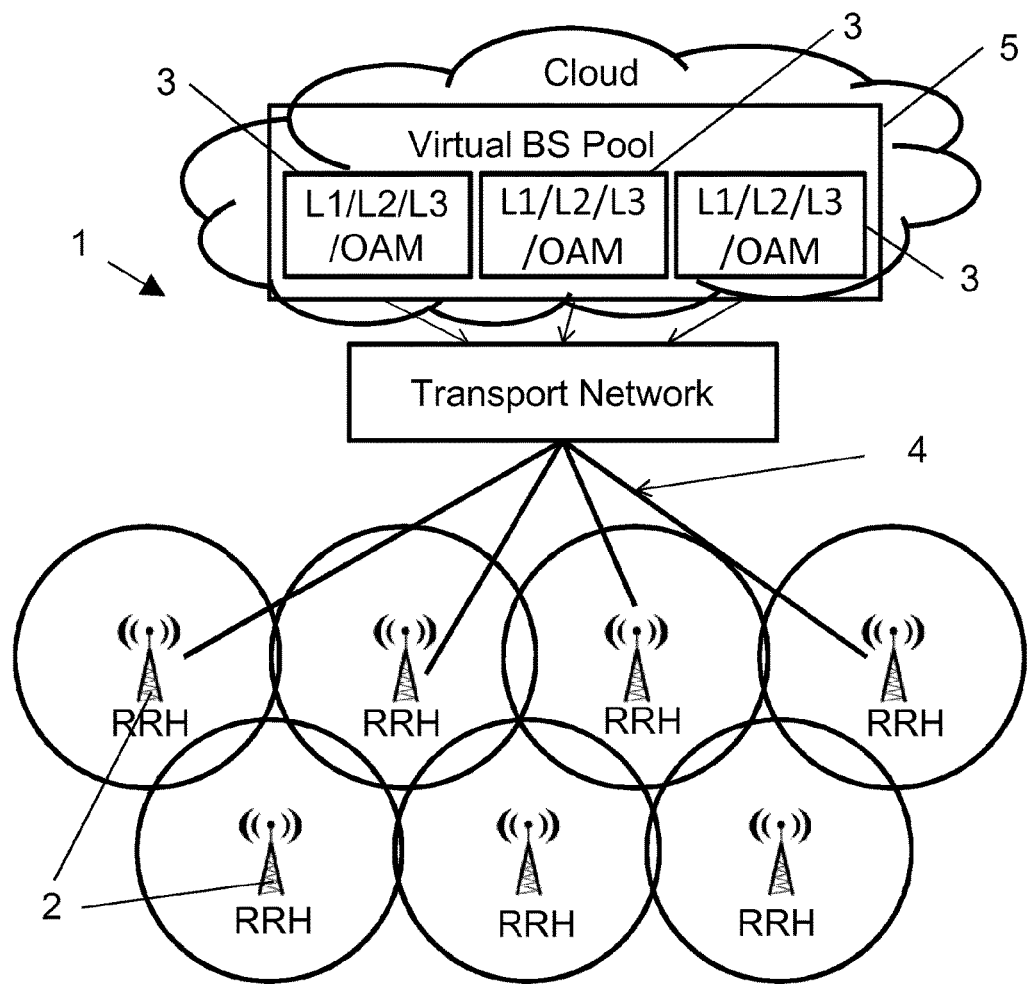
FIG. 1 is a schematic view illustrating a fully centralized C-RAN architecture.

In a virtualized environment, it may be required under certain circumstances to reassign base stations to another virtual machine. The main reasons for moving base station processing between different virtual machines are the following:

1. Maintenance of hardware and software: In this case, the data center operator needs to update either hardware or software resources. Therefore, IT infrastructure running virtual machines will be turned off. Generally, this requires moving virtual machines first onto different IT infrastructure which is not affected by maintenance.
2. Increased demand of resources: Although virtual machines may scale in the number of physically occupied resources (memory and CPU), it may happen that the expected maximum resource occupation will be exceeded. In this case, it would be necessary to move base station processing to new virtual machines which are provided with more resources.
3. Failure of equipment: In this case, the IT infrastructure is affected by an unexpected event which results in failure of equipment and the unavailability of virtual machines which perform base-station processing.

Embodiments of the present invention can allow for active and planned relocation of base station processing between different virtual machines and thereby provide for cases 1 and 2 above. Case 3 above is related to an unplanned relocation, which would require different mechanisms to recover RAN operation. In current state of the art virtualized environments, the migration of virtual machines may take up to several seconds with a downtime of many 100 ms. For instance, in LTE 100 ms equal 100 subframes, which is an unacceptable interruption to operate a mobile radio access network. Generally, it should be assumed that a mobile terminal in LTE is going to disconnect from a base station in case it does not receive any response within a time limit that is in a range smaller than 10 ms.

A method for operating a centralized radio access network, C-RAN, and a C-RAN are described herein that allow base station processing to be moved between virtual machines in a seamless way, i.e. without causing failures within the RAN.

In a method according to an embodiment of the invention, relocation of base station processing from a first virtual machine, which performs base station processing for a given base station that serves a particular cell—initial cell—, to a second virtual machine is performed by introducing an additional cell—target cell—for which said second virtual machine performs base station processing, transmitting via at least a part of the antennas of said base station at the same time signals for both said initial cell and said target cell, and handing over the user terminals that are assigned to said initial cell to said target cell.

Furthermore, in a centralized radio access network according to an embodiment of the invention, a centralized processing entity is configured to perform relocation of base station processing from a first virtual machine, which performs base station processing for a given base station that serves a particular cell—initial cell—, to a second virtual machine by introducing an additional cell—target cell—for which said second virtual machine performs base station processing, transmitting via at least a part of the antennas of said base station signals for both said initial cell and said target cell, and handing over the user terminals that are assigned to said initial cell to said target cell.

Still further, a base station according to an embodiment of the invention includes a radio unit configured in such a way that at least a part of the antennas transmit at the same time signals for two different cells.

Typical downtimes associated with traditional migration of virtual machines (VM) are much too long for being acceptable in connection with VM migration in a virtual base station pool of a virtualized C-RAN. As a solution, embodiments of the present invention perform VM migration by using a handover process. Specifically, an additional cell is introduced as a target cell, and the handover process is performed by using the same set of antennas of a base station (which usually transmits only signals of a single cell) to transmit control channels of two different cells, i.e. initial cell and target cell.

Consequently, the present invention solves the problem of moving seamlessly base-station processing between virtual machines without causing failures within the RAN. Since the handover process can be executed within a very short time period, the proposed solution is fast enough to avoid unacceptable interruptions. Insofar, from a user perspective, the solution is transparent. Furthermore, the present invention is beneficial in that it can exploit existing network mechanisms, for instance, in case of LTE, the standardized 3GPP LTE handover process (as described in detail, e.g., in 3GPP LTE TS36.331, Release 9) can be used. Another advantage of the present invention lies in the fact that the proposed solution is scalable in the number of users which are attached to the base stations that are processed within the moved virtual machine.

According to a preferred embodiment, it may be provided that a predefined part of the antennas of the base station transmit signals for the initial cell, while the remaining antennas transmit signals for the target cell. In this case, however, a reconfiguration of the initial cell is required once the handover of all user terminals to the target cell is terminated. Therefore, in order to avoid the need of such reconfiguration, in an alternative embodiment all antennas of the base station are configured to transmit signals for both the initial cell and the target cell.

Once the target cell is configured, it may be provided that the user terminals that are assigned to the initial cell issue measurement reports. The issuance of these measurement reports may be triggered by the initial cell. Upon receiving the measurement reports, the initial cell can make sure that all user terminals that are assigned to the initial cell successfully receive signals from the target cell.

Advantageously, in order to avoid or at least minimize degraded performance due to interference, it may be provided that system information for the initial cell and the target cell are scheduled to be transmitted in orthogonal time windows. Moreover, in case of application scenarios in 3GPP LTE, the master information block, which in 3GPP LTE depends on the subframe number (SFN), can be orthogonalized between the initial cell and the target cell. Still further, in order to compensate for the higher interference power between the initial cell and the target cell, transmit diversity of multiple antennas may be applied and/or the signal transmission may be repeated for a predefined or configurable number of times. For instance, up to four repetitions may be envisioned.

According to a preferred embodiment the user terminals may be handed over in batches, wherein the size of the batches may be determined dependent on the number of available random access resources that guarantee a fast and collision free access to the target cell. Assuming realistic conditions as they will exist in typical application scenarios, it can be assumed that user terminals assigned to the initial cell can be handed over to the target cell within very few batches, if not within a single batch.

After handover of all user terminals from the initial cell to the target cell, it may be provided that the first virtual machine, which has performed base station processing for the base station serving the initial cell, is turned off.

According to a preferred embodiment it may be provided that a pool of predefined cell identifiers (hereinafter briefly denoted cell-ids) is maintained, which may be used as temporary cell-ids for moving virtual machines at the centralized processing entity. This would have the advantage that it is not required each time to search for currently occupied cell-ids and to search for cell-ids which could be used for moving the virtual machines. Furthermore, it may be provided that the pool of predefined cell identifiers is assembled to include a minimum set of cell-ids with optimal properties, e.g. orthogonal reference signals, such that the initial cell and the target cell will be able to use orthogonal control channels (including orthogonal reference signals).

According to a preferred embodiment the user terminals may be handed over back to the initial cell for the purpose of cell identifier restoration, i.e., more specifically, to reassign to the target cell the original cell-id of the initial cell.

Regarding the implementation of the centralized radio access network, basically two different design solutions may be envisioned: L1-CRAN and L2-CRAN. In L1-CRAN, all digital baseband processing is centralized and only digital-to-analog conversion and all analog processing is implemented at the remote radio head of the base station. On the link between the centralized processing entity and the remote radio head, only I/Q (In-Phase/Quadrature) samples are transmitted which already contain all necessary information for the radio interface. In this case, for implementing the present invention, no changes at the remote radio head are required, but only at the centralized processing entity. Specifically, the centralized processing entity may be configured, to carry out the multiplexing of signals originating from the initial cell and from the target cell.

On the other hand, in L2-CRAN, the low-layer digital baseband processing is performed at the remote radio head, while higher layer processing is performed at the centralized processing entity, e.g. all physical layer functionality is performed at the remote radio head and all MAC and higher layer processing is performed at the centralized processing entity. In this case, the signals originating from the initial cell and from the target cell may be multiplexed at the radio unit of the respective base station, which may be realized by suitable configuration of the base station's remote radio head.

Figure 2:
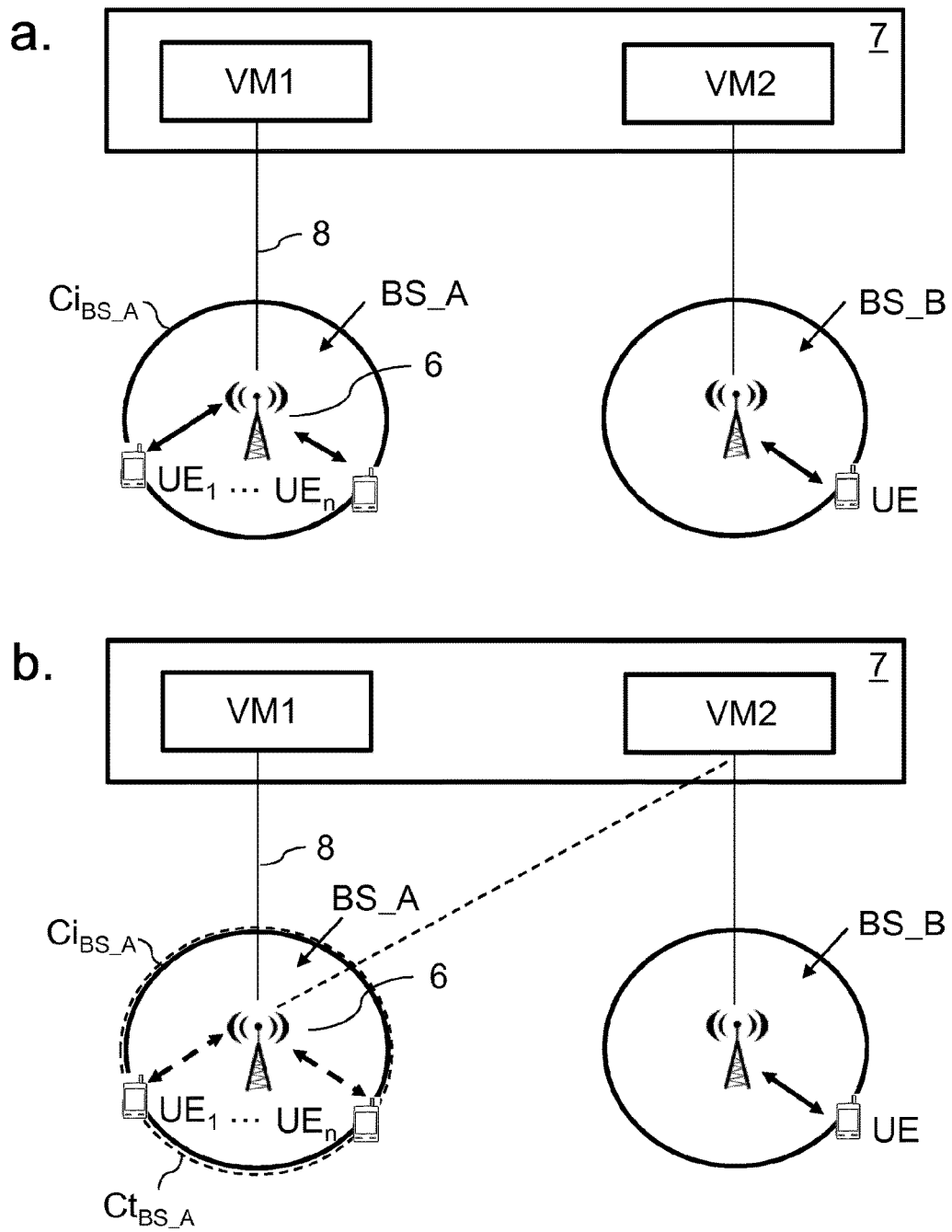
FIG. 2 is a schematic view illustrating the concept of virtual machine migration in a virtualized radio access network in accordance with an embodiment of the invention.

FIG. 2 schematically illustrates an embodiment of the present invention according to which virtual machine (VM) migration in a virtualized C-RAN is performed by applying a handover mechanism to the user terminals that are connected/assigned with a particular base station. In the illustrated embodiment it is assumed that the standardized handover mechanism, as described in detail e.g. in 3GPP LTE TS36.331, Release 9, is exploited in order to move base station processing between different VMs. The handover procedure allows for re-assigning user terminals between different base stations. Since those skilled in the art are sufficiently familiar with this handover procedure, detailed of the procedure can be omitted here. Just briefly summarized, the actual handover procedure in 3GPP LTE is as follows:

1. UE permanently measure the radio link quality. If a certain event condition has been fulfilled (e.g. A3, which is one handover trigger event defined in LTE), the UE enters the time-to-trigger (TTT) phase.
2. During the TTT phase, the UE keeps measuring the radio link quality and if the event condition is still fulfilled, a measurement report is issued and sent to the base station BS.
3. The BS evaluates the measurement report, negotiates a handover with the target cell and then sends the handover command to the UE.
4. After receiving the handover command, the UE will execute the handover by accessing the target cell.

For the sake of simplicity, FIG. 2 only depicts two virtual machines VM1 and VM2, which are established at a centralized processing entity and which perform (part of) base station processing. It is to be understood that in real scenarios, there will typically be a higher number of virtual machines. A hypervisor gives each VM access to a certain part of the physical resources of the centralized processing entity.

FIG. 2a schematically illustrates an initial situation of the procedure in accordance with embodiments of the invention: Base station BS A, which comprises a radio unit 6 including a number of antennas, serves initial cell $Ci_{BS\_A}$. Base station BS A comprises communication means for enabling communication between the radio unit 6 and centralized processing entity 7 via a backhaul link, e.g. via fiber connection 8, and it has its base station processing performed by VM1, which is established at centralized processing entity 7. Correspondingly, VM2 performs base station processing for base station BS B, which serves another cell, denoted $C_{BS\_B}$. It is assumed now that VM1 has to be shut down, for instance because part or all of the physical resources that are used by VM1 are undergoing maintenance operations. Therefore, the centralized processing entity 7 would trigger a procedure according to the present invention, which will be described hereinafter in detail. Another situation in which the centralized processing entity 7 could trigger this procedure would be that it receives notification from a base station according to which the expected maximum resource occupation for this base station will be exceeded.

In order to use the handover procedure for moving base station processing between virtual machines, an additional cell can be introduced. This additional cell, which is the target cell denoted $Ct_{BS\_A}$, is indicated in FIG. 2b by the dashed line circle. Let VM2 denote the virtual machine which is supposed to take over from VM1 the base station processing for BS A. Here, it should be noted that a VM can perform base station processing for more than one base station at the same time, i.e. in the illustrated embodiment for BS A and BS B. According to embodiments of the invention, the user terminals that are assigned to initial cell $Ci_{BS\_A}$ (for which VM1 performs base station processing), i.e. $UE_1 \ldots UE_n$ should be handed over to target cell $Ct_{BS\_A}$ (for which VM2 performs base station processing, as indicated by the dashed line).

Figure 3:
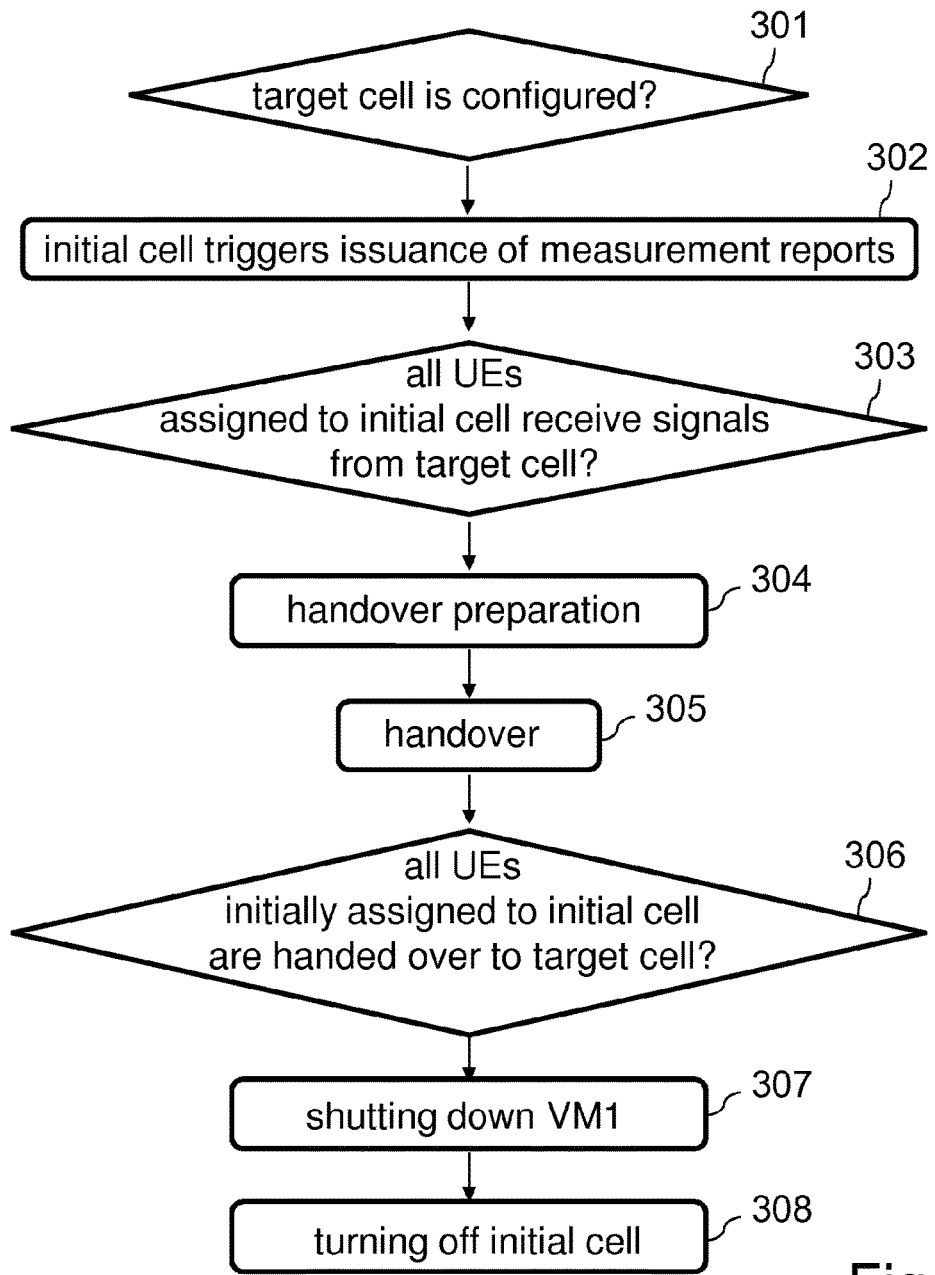
FIG. 3 is a flow diagram illustrating the process of virtual machine migration in a virtualized radio access network in accordance with an embodiment of the invention.

In order to perform the handover from $Ci_{BS\_A}$ to $Ct_{BS\_A}$, for a short period of time either all antennas of the physical base station BS A transmit signals for both cells $Ci_{BS\_A}$ and $Ct_{BS\_A}$, or part of the antennas of the physical base station BS A transmits signals for cell $Ci_{BS\_A}$, while the remaining antennas transmit signals for cell $Ct_{BS\_A}$. In the latter case, a reconfiguration of cell $Ci_{BS\_A}$ will be performed. In both cases, cells $Ci_{BS\_A}$ and $Ct_{BS\_A}$ can be measured and monitored by the user terminals $UE_1 \ldots UE_n$ assigned to cell $Ci_{BS\_A}$. Once the new cell $Ct_{BS\_A}$ is configured, the following steps are performed, which are illustrated in the flow diagram of FIG. 3:

After the target cell $Ct_{BS\_A}$ is configured, as shown at 301, in step 302 measurement reports from user terminals $UE_1 \ldots UE_n$ assigned to $Ci_{BS\_A}$ are issued (for instance, after trigger by $Ci_{BS\_A}$). In step 303, $Ci_{BS\_A}$ receives measurement reports in order to make sure that all user terminals $UE_1 \ldots UE_n$ connected with $Ci_{BS\_A}$ receive successfully signals from $Ct_{BS\_A}$. In a next step, shown at 304, VM1 and VM2 perform the handover preparation according to 3GPP LTE. In the next step 305, user terminals $UE_1 \ldots UE_n$ are then handed over from $Ci_{BS\_A}$ to $Ct_{BS\_A}$ successively. Specifically, these handovers may be carried out in batches of K users where K is the number of available random access resources guaranteeing a fast and collision free access to $Ct_{BS\_A}$. In step 306, a final check is it carried out whether all user terminals $UE_1 \ldots UE_n$ have been successfully handed over to $Ct_{BS\_A}$. If so, $Ci_{BS\_A}$ is turned off (step 307) and VM1 is shut down (step 308). In FIG. 2b, successful handover of user terminals $UE_1 \ldots UE_n$ to target cell $Ct_{BS\_A}$ is indicated by the dashed line double arrows.

The previous steps can be repeated in order to assign again the original cell-id of $Ci_{BS\_A}$ to cell $Ct_{BS\_A}$. Generally, it could be provided that a pre-defined set of cell-ids is maintained, which are used as temporary cell-ids for moving virtual machines. This has the advantage that it is neither necessary to search for currently occupied cell-ids, nor for cell-ids which could be used for moving the virtual machines. Furthermore, a minimum set of cell-ids with optimal properties could be maintained, e.g. orthogonal reference signals such that $Ci_{BS\_A}$ and $Ct_{BS\_A}$ will be able to use orthogonal control channels (including reference signals).

The higher interference power between $Ci_{BS\_A}$ and $Ct_{BS\_A}$ can be a significant challenge. However, if applied to 3GPP LTE, the control channel can still be operated below 0 dB actual SNR. Furthermore, system information of $Ci_{BS\_A}$ and $Ct_{BS\_A}$ can be scheduled into orthogonal time windows, reference depend upon cell-id and can therefore be orthogonalized. The master information block (MIB) in 3GPP LTE further depends on the subframe number (SFN) and can therefore be orthogonalized between $Ci_{BS\_A}$ and $Ct_{BS\_A}$. The physical broadcast channel which is used to broadcast the MIB is operable down to −1 dB. In addition, up to four repetitions can be applied which further reduces the minimum to −7 dB. If multiple antennas and transmit diversity are applied, the minimum SNR can be reduced to −10 dB (two antennas) or −13 dB (four antennas). This SNR is sufficient to operate the required control channels if C1 and C2 are transmitted from the same set of antennas.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a centralized radio access network (C-RAN) including a plurality of base stations, wherein at least a portion of base station processing is performed at a centralized processing entity, and wherein a virtualized environment is provided by the centralized processing entity such that the plurality of base stations run in virtual machines, the method comprising:
    relocating base station processing for a first base station from a first virtual machine that performs base station processing for an initial cell to a second virtual machine,
    wherein relocating the base station processing from the first virtual machine to the second virtual machine includes:
        introducing a target cell for which the second virtual machine performs base station processing,
        configuring at least a portion of antennas of the first base station to transmit signals for the target cell, and
        handing over user terminals that are assigned to the initial cell to the target cell.

2. The method according to claim 1, wherein a predefined portion of the antennas of the first base station transmit signals for the initial cell, and the remaining antennas are the portion of antennas of the first base station that are configured to transmit signals for the target cell.

3. The method according to claim 1, wherein configuring at least a portion of the antennas of the first base station to transmit signals for the target cell comprises configuring all antennas of the first base station to transmit signals for the target cell such that all antennas of the first base station are configured to transmit signals for both the initial cell and the target cell.

4. The method according to claim 1, wherein the user terminals that are assigned to the initial cell issue measurement reports once the target cell is configured.

5. The method according to claim 1, wherein system information for the initial cell and the target cell are scheduled to be transmitted in orthogonal time windows.

6. The method according to claim 1, wherein signal transmission is repeated for a predefined or configurable number of times.

7. The method according to claim 1, wherein handing over the user terminals that are assigned to the initial cell to the target cell is performed in batches, and wherein a size of the batches is determined based on a number of available random access resources.

8. The method according to claim 1, wherein the first virtual machine is turned off after handover of all user terminals from the initial cell to the target cell.

9. The method according to claim 1, wherein a cell identifier for the target cell is chosen from a pre-defined set of cell identifiers which is maintained for being used as temporary cell identifiers for moving virtual machines.

10. The method according to claim 9, wherein the predefined set of cell identifiers is selected to include cells with orthogonal reference signals.

11. The method according to claim 1, wherein after handing over the user terminals that are assigned to the initial cell to the target cell, the user terminals are handed over to a cell having a same cell identifier as the initial cell for the purpose of cell identifier restoration.

12. The method according to claim 1, further comprising:
receiving, from the user terminals that are assigned to the initial cell, measurement reports; and
verifying, from the measurement reports, that the user terminals that are assigned to the initial cell successfully receive signals from at least one of the antennas of the first base station configured to transmit signals for the target cell.

13. The method according to claim 1, wherein the base station processing that is relocated from the first virtual machine to the second virtual machine includes one or more of low-layer digital baseband processing and higher layer processing.

14. The method according to claim 1, wherein the configuring at least a portion of the antennas of the first base station to transmit signals for the target cell is performed such that each antenna of the portion of the antennas of the first base station is configured to transmit control signals generated by the first virtual machine for the initial cell and to transmit control signals generated by the second virtual machine for the target cell.

15. The method according to claim 1, wherein the portion of the antennas of the first base station configured to transmit signals for the target cell are configured to transmit control signals provided by the second virtual machine,
wherein a second portion of the antennas of the first base station are configured to transmit control signals for the initial cell provided by the first virtual machine.

16. The method according to claim 15, wherein the portion of the antennas of the first base station and the second portion of the antennas of the first base station are one of mutually exclusive, not mutually exclusive, or identical.

17. A centralized radio access network (C-RAN), comprising:
a plurality of remote radio heads (RRH), and
a centralized processing entity configured to perform at least a part of base station processing, wherein a virtualized environment is provided by the centralized processing entity such that the base station processing is performed by virtual machines, and wherein the centralized processing entity is configured to perform relocation of base station processing for a first base station from a first virtual machine that performs base station processing for an initial cell to a second virtual machine,
wherein relocating the base station processing from the first virtual machine to the second virtual machine includes:
introducing a target cell for which the second virtual machine performs base station processing,
configuring at least a portion of antennas of the first base station to transmit signals for the target cell, and
handing over user terminals that are assigned to the initial cell to the target cell.

18. The centralized radio access network according to claim 17, wherein the network is designed as an L1-CRAN, and wherein multiplexing of signals originating from the initial cell and from the target cell is performed at the centralized processing entity.

19. The centralized radio access network according to claim 17, wherein the network is designed as an L2-CRAN, and wherein multiplexing of signals originating from the initial cell and from the target cell is performed at an RRH of the first base station.

20. A base station for deployment in a centralized radio access network (C-RAN) according to claim 17, the base station comprising:
a remote radio head (RRH) including a number of antennas, and
a communicator for enabling communication between the RRH and a virtual machine established at a centralized processing entity where at least a part of base station processing is performed,
wherein the RRH is configured such that at least a part of the antennas simultaneously transmit signals for two different cells.

* * * * *